US012365566B2

(12) United States Patent
Kriener et al.

(10) Patent No.: US 12,365,566 B2
(45) Date of Patent: Jul. 22, 2025

(54) RELEASE UNIT FOR ACTUATING AN ELEVATOR BRAKE DEVICE

(71) Applicant: Wittur Holding GmbH, Wiedenzhausen (DE)

(72) Inventors: Karl Kriener, Viehdorf (AT); René Holzer, Scheibbs (AT); Christoph Russwurm, Ober-Grafendorf (AT); Leopold Latschbacher, Neustadtl a.d. Donau (AT); Lukas Schwaigerlehner, Scheibbs (AT)

(73) Assignee: Wittur Holding GmbH, Wiedenzhausen (DE)

( * ) Notice: Subject to any disclaimer, the term of this patent is extended or adjusted under 35 U.S.C. 154(b) by 0 days.

(21) Appl. No.: 17/767,947

(22) PCT Filed: Oct. 12, 2020

(86) PCT No.: PCT/EP2020/078608
§ 371 (c)(1),
(2) Date: Apr. 11, 2022

(87) PCT Pub. No.: WO2021/069739
PCT Pub. Date: Apr. 15, 2021

(65) Prior Publication Data
US 2024/0383725 A1 Nov. 21, 2024

(30) Foreign Application Priority Data
Oct. 10, 2019 (DE) ......................... 202019105584.7

(51) Int. Cl.
*B66B 5/22* (2006.01)

(52) U.S. Cl.
CPC ...................................... *B66B 5/22* (2013.01)

(58) Field of Classification Search
CPC ................ B66B 5/22; B66B 5/04; B66B 5/16
See application file for complete search history.

(56) References Cited

U.S. PATENT DOCUMENTS 6,173,813 B1 * 1/2001 Rebillard .................. B66B 5/06 187/287
10,894,695 B2 * 1/2021 Billard ...................... B66B 5/18
(Continued)

FOREIGN PATENT DOCUMENTS

DE 102013111385 A1 * 4/2015 ............... B66B 5/18
EP 1902993 A1 3/2008
(Continued)

OTHER PUBLICATIONS

Machine translation of FR 3022230 A1 (Year: 2015).*

*Primary Examiner* — Anna M Momper
*Assistant Examiner* — Michelle M Mudwilder

(57) ABSTRACT

A triggering unit for actuating an elevator braking device, having a triggering base body which can be mounted on an elevator car, a trigger, a contact element and a coupling link via which the contact element can be connected to an elevator braking device, the triggering unit keeps the contact element at a distance from the guide rail in the untriggered state and brings it into frictional contact with the rail in the triggered state, so that the contact element moves along a gap between the triggering base body and the guide rail, carries along the coupling link and causes the elevator braking device to respond automatically due to the movement of the coupling link, wherein the triggering unit can be mounted separately on the elevator car at a distance from the elevator braking device and is connected to the elevator braking device exclusively via the coupling link.

12 Claims, 12 Drawing Sheets

(56) References Cited

U.S. PATENT DOCUMENTS

| | | | | |
|---|---|---|---|---|
| 2012/0152658 | A1* | 6/2012 | Osmanbasic | B66B 5/04 187/288 |
| 2017/0283217 | A1* | 10/2017 | Marvin | B66B 5/0031 |
| 2018/0354749 | A1* | 12/2018 | Fauconnet | B66B 5/044 |
| 2019/0300331 | A1 | 10/2019 | Sudi et al. | |
| 2020/0048042 | A1* | 2/2020 | Sanchez Munoz | B66B 5/18 |
| 2020/0130985 | A1* | 4/2020 | Ruhnke | B66B 5/22 |
| 2020/0207581 | A1* | 7/2020 | Sotoca | B66B 7/046 |

FOREIGN PATENT DOCUMENTS

| | | | | |
|---|---|---|---|---|
| EP | 1902993 | B1 | 10/2009 | |
| EP | 2837592 | A1 | 2/2015 | |
| EP | 3225579 | A1 | 10/2017 | |
| FR | 3022230 | A1 * | 12/2015 | B66B 5/044 |
| WO | 2006077243 | A1 | 7/2006 | |
| WO | 2012128758 | A1 | 9/2012 | |

* cited by examiner

RELEASE UNIT FOR ACTUATING AN ELEVATOR BRAKE DEVICE

The invention relates to a triggering unit for actuating an elevator braking device.

TECHNICAL BACKGROUND

Elevators are normally equipped with an elevator braking device which decelerates or catches the elevator car in the event of an impermissibly high travel speed. Possible reasons for an impermissibly high acceleration of the elevator car are, for example, a malfunction in the control of a drive or its brake or a broken cable.

The elevator braking device can be activated in various ways. In the case of purely mechanical triggering units, the braking device is often activated by an overspeed governor installed in the shaft. With such triggering units, a self-contained governor rope mounted in the elevator shaft is deflected by the overspeed governor and a tensioning roller. The governor rope is connected at one point to the braking device of the elevator car or the braking element of the braking device and is accordingly carried along by the elevator car when it moves. An impermissibly high travel speed then causes the overspeed governor to decelerate the governor rope. Since the governor rope thus moves more slowly in the elevator shaft than the elevator car and the braking element attached to it, the governor rope exerts a pulling force on the braking element. This activates the braking device.

However, purely mechanical triggering units of this type have various disadvantages, such as their susceptibility to malfunction, if the overspeed governor becomes dirty, or the relatively high cost of installation.

Due to the disadvantages of mechanical triggering units, an increasing trend towards electromagnetic triggers can be observed. However, such triggers are usually developed individually for each elevator braking device, so that a separate safety certification must be made for each combination of triggering unit and braking device.

STATE OF THE ART

In modern elevators, the shaft is usually equipped with sensors arranged at regular intervals or even a complete shaft copying which detect overspeed. In the event of overspeed, a signal is then sent to the mostly electromagnetically based triggering unit. These triggering units are usually designed in such a way that they automatically activate the braking process in the event of a power failure.

A typical elevator braking device equipped with an electromagnetic triggering unit is described for example in WO2006/077243A1. This shows a braking device for an elevator car, the braking element of which is held in an inactive position by a retaining element as long as the elevator car is not to be braked. The retaining element is an electromagnet which attracts the braking element in the form of a brake roller and thus prevents it from getting into contact with the guide rail of the elevator. As soon as an impermissibly high speed is measured or the elevator is to be braked for other reasons, the electromagnet is switched off and the braking element is pressed in the direction of the guide rail by a compression spring. There, the brake roller rolls along the guide rail and runs into a wedge-shaped gap between the guide rail and a pressure element, which is also part of the braking device. The brake roller equipped with a friction surface decelerates the elevator car. In order to bring the braking element back from its braking position into the inactive position, the electromagnet is activated. In this way, the braking element is moved against the action of the compression spring back into a position in which there is no longer any contact with the guide rail. However, before the electromagnet is able to attract the braking element, it must be pushed out of the wedge-shaped gap. To do this, the elevator car is usually moved back a little.

However, this braking device requires a relatively strong electromagnet, since there is a relatively large air gap between the magnet and the braking element due to the swivel kinematics.

A similar elevator braking device with an electromagnetic triggering unit is known from European patent specification EP1902993B1. In this case, however, the braking element is not directly actuated by the triggering unit which also consists of an electromagnet and a compression spring. Instead, the electromagnet and the compression spring act on a guiding element that guides the braking element. Since the air gap between the guiding element and the electromagnet is smaller than in the braking device from WO2006/077243A1, a significantly less powerful electromagnet can be used.

The combinations described above of elevator braking devices and triggering units are usually completely new assemblies that have to be elaborately developed and certified for each load and speed range.

OBJECT OF THE INVENTION

In view of this, it is the object of the invention to specify a universally usable triggering unit with which elevator braking devices that previously had to be actuated or activated mechanically by means of an overspeed governor rope can be activated electrically.

THE SOLUTION ACCORDING TO THE INVENTION

Accordingly, a triggering unit for actuating an elevator braking device is provided, with a triggering base body that can be mounted on the elevator car, a trigger, a contact element for generating actuating forces through frictional contact with the guide rail, and a coupling link.

The contact element can be connected to an elevator braking device via the coupling link, preferably in the manner described in more detail later.

The triggering unit is designed in such a way that its trigger keeps the contact element at a distance from the guide rail in the untriggered state and brings it into frictional contact with the rail in the triggered state. In the event of a relative movement between the elevator car and the guide rail, the contact element which is in frictional contact with the rail, moves along a gap between the triggering base body and the guide rail. In doing so, the contact element carries along the coupling link and causes the elevator braking device to respond automatically due to the movement of the coupling link. The triggering unit is characterized in that it can be mounted separately on the elevator car or even at a distance from the elevator braking device and is exclusively connected to the elevator braking device via the coupling link.

The triggering unit is mounted on the elevator car in such a way that the triggering base body and the trigger are close to the guide rail. The distance from the guide rail is selected in such a way that the trigger prevents contact between the contact element and the guide rail in its untriggered state.

As long as there is no contact between the contact element and the guide rail, the contact element moves simultaneously with the elevator car through the elevator shaft. The speed and direction of movement of the elevator car and the contact element are therefore the same.

As already described at the outset, modern elevators generally have sensors or shaft copying in the elevator shaft, which detect an impermissibly high speed of the elevator car. As soon as this is the case or some other problem, such as a power failure, requires activation of the elevator braking device, the trigger is activated, i.e. brought into its triggered state. In doing so, it assumes a position through which the contact element comes into contact with the guide rail. During this time, the contact between the contact element and the trigger or the triggering base body remains in place.

As soon as the contact element is in contact with the guide rail and the trigger at the same time, it moves slower than the elevator car through the elevator shaft due to friction. When the elevator car moves down, the contact element therefore moves upwards relative to the elevator car.

The coupling link which is connected to the contact element at one end and the brake wedge of the elevator braking device connected to it at the other end of the coupling link then also move upwards relative to the elevator car. However, since the elevator braking device mounted on the elevator car continues to move down the elevator shaft simultaneously with the elevator car, the brake wedge also moves upwards relative to the elevator braking device.

Due to the displacement of the contact element which is transmitted via the coupling link to the elevator braking device the brake wedge is brought into the braking position. From this braking position, the elevator braking device responds automatically and finally decelerates the elevator car.

In terms of the basic functional principle, even if the contact element interacts with the guide rail in the same way that a brake wedge actually does, there is a fundamental difference to the brake wedge: unlike the brake wedge, the contact element as such does not have any braking effect on the rail that decelerates the elevator car or slows it down more than just insignificantly. The contact element merely provides the servo effect in terms of force that is necessary to start the elevator braking device. This function of generating braking forces that reduce the speed of the elevator car is rather reserved for the elevator braking device actuated by it with its at least one brake wedge, brake roller or brake eccentric.

A separate assembly is understood to mean a fastening in which the triggering unit can be attached to and removed from the elevator car completely independently of the elevator braking device. A spaced assembly is understood to mean an assembly in which direct contact between the triggering unit and the elevator braking device is realized exclusively via a coupling link, preferably designed in the manner of a pull rod which is usually articulated in a rotatable manner on both sides, and in which their separate housings have no direct physical contact with one another.

Due to the fact that the triggering unit can be mounted on the elevator car separately or at a distance from the elevator braking device, a specific triggering unit can be used for different elevator braking devices. The distance between the elevator braking device and the triggering unit is determined by the length of the coupling link.

The connection between the triggering unit and the elevator braking device via the coupling link is preferably detachable, so that individual components of the triggering unit or the entire triggering unit or individual components of the elevator braking device or the entire elevator braking device can be replaced. The connection or the means enabling the connection on the triggering unit are preferably designed such that different elevator braking devices can be connected to the triggering unit for the purpose of activating them without any structural changes having to be made to the triggering unit. In any case, no structural changes are required, each of which requires re-certification. In all of this, preferably no changes or at least no changes requiring re-certification have to be made to the elevator braking device.

The term “guide rail” preferably refers to the guide rail of the elevator car extending in the elevator shaft. However, this term also covers an additional rail mounted in the elevator shaft, which could be called a “brake rail”.

The term “untriggered state” refers to the position of the trigger in which contact between the contact element and the guide rail is not possible.

The term “triggered state” refers to the position of the trigger in which it was moved in the direction of the guide rail so that the contact element rests against the guide rail.

The term “brake wedge” of the elevator braking device typically refers to the movable element of an elevator braking device which activates the braking process by being driven into a wedge-shaped gap between the elevator braking device and the guide rail. It is also conceivable that the “wedge” is a roller that creates a wedging effect in the gap into which it is driven in or an eccentric that causes an increase in the normal force when rotated.

The term “braking position” refers to the position of the brake wedge from which it is automatically driven deeper and deeper into the wedge-shaped gap between the elevator braking device and the guide rail by the movement of the elevator car until the elevator car comes to a standstill.

The term “automatic response” of the elevator braking device refers to the state, when the brake wedge of the elevator braking position is in the braking position.

PREFERRED EMBODIMENTS

There are a number of ways in which the invention can be designed to further improve its effectiveness or usefulness.

Thus, it is particularly preferred to design the triggering unit in such a way that, when the elevator car is reset from the catch, the contact element moves along the gap between the triggering base body and the guide rail. In doing so, it applies sufficient forces to move a brake wedge of the elevator braking device in its fully released standby position by means of the coupling link, together with the forces that occur anyway on the brake wedge during reversing.

During the braking process, the brake wedge is driven into a gap between the base body of the elevator braking device and the guide rail due to the downward movement of the elevator car and the elevator braking device attached to it. The state, when the brake wedge was clamped in the gap between the guide rail and the base body of the elevator braking device and the elevator car was completely stopped, is referred to as a catch.

In order to restart an elevator car after a catch, it is moved in the opposite direction to remove the brake wedge (or brake wedges) from the gap again. Due to the movement in the opposite direction, the brake wedge is pulled out of the gap again. Since the brake wedge is still connected to the contact element by means of the coupling link, the contact element is completely moved back into its standby position by the reset of the brake wedge, even if it temporarily no longer has sufficient frictional contact to move towards its standby position by rolling along in a defined manner, for example, because the trigger has been attracted again by the electromagnet and brought into its untriggered position. Only when the brake wedge has been moved out of the wedge-shaped gap so that there is no longer any contact, the brake wedge is again attached to the contact element via the coupling link and is further lowered by the movement of the contact element or falls back, together with it, into the standby position under the influence of gravity.

The term "fully released standby position" describes the state of the braking device in which its brake wedge has no contact with the guide rail.

In a further preferred embodiment, the contact element is connected to the coupling link in such a way that the contact element can move by a certain amount without carrying along the coupling link.

This configuration is particularly advantageous when the triggering unit according to the invention is de-energized in standby mode to reduce the power consumption and then-over the possibly longer period of standby operation-position changes or small position changes occur. Temperature fluctuations, which are relevant not least for elevators in high-rise buildings, should be mentioned here as an example. The case where the building has 25 floors and then the elevator car, in its standby position on the ground floor, hangs on a more than 50 m long suspension rope is just an example for that. The corresponding change in length is already considerable with a temperature fluctuation of 10°.

Even a slight movement away from the stop, while the triggering unit is de-energized, can thus be compensated. Such a moving away can occur when the elevator car is heavily loaded or unloaded at a stop and the car weight therefore changes significantly.

Due to the slight lowering of the elevator car, the brake wedge of the elevator braking device can be driven at least a little bit into the wedge-shaped gap assigned to it, if no special precautions are taken. This hinders trouble-free onward travel.

The fact that the contact element can move in a translational manner by a certain amount without carrying along the coupling link means that the elevator braking device does not immediately go into its self-locking catching position. Car vibrations or other negligible car movements do then not cause any damage. Resetting the elevator car is therefore not necessary after such harmless movements, but it is sufficient to move the trigger back into its untriggered position. The "translational" movement of the contact element by a certain amount refers to the movement relative to the coupling link.

Ideally, the coupling link has an elongated hole via which it is connected to the contact element, preferably by means of a bolt. The coupling link is only carried along by the contact element, when the bolt connecting the contact element and the coupling link has reached the upper end of the elongated hole.

The embodiment in question is preferably realized in that the contact element is provided with a bolt which is guided along an elongated hole in the coupling link. The contact element, the bolt and the elongated hole must be positioned relative to one another in such a way that the bolt is located in the lower area of the elongated hole when the trigger is not activated. After the bolt had been moved upwards by a certain amount by the contact element, it rests against the upper end of the elongated hole. A further upward movement of the contact element and the bolt relative to the coupling link then results in the coupling link being pulled upwards by the bolt.

At the end pointing away from the contact element, the bolt ideally has a diameter that is larger than the diameter of the elongated hole. If the end of the bolt, at which the diameter is smaller, is first passed through the elongated hole and then through the contact element and afterwards secured with a locking ring against axial slipping with respect to the contact element, the contact element is also secured against impermissible displacement in the axial direction with respect to the coupling link.

Preferably, the running surface of the triggering base body the contact element runs along when it is in contact with the guide rail and that abuts on the trigger is pressed in the direction of the guide rail by means of preloaded springs. When the contact element is in the corresponding section of the gap between the triggering base body and the guide rail, the running surface exerts a force on the contact element.

If there is too little friction between the contact element and the guide rail, it can sometimes lead to the contact element not being able to take the coupling link and, via the coupling link, also the brake wedge of the braking device upwards relative to the elevator car. Instead, it is pulled by the rest of the triggering unit and simply slides along the guide rail. In the worst case, this leads to the elevator braking device not being activated.

Since the friction between the contact element depends on the friction coefficient on the one hand and the normal force with which the contact element is pressed onto the guide rail on the other hand, it makes sense to increase the normal force. This can be done by pressing the area of the base body of the triggering unit that is adjacent to the trigger in the direction of the guide rail by means of one or more preloaded springs. If the contact element now passes the running surface of the area pressed by springs in the direction of the guide rail, the contact element is also pressed in the direction of the guide rail. The friction between the contact element and the guide rail is thus increased.

It is also conceivable to press the running surface of the base body of the triggering unit, which is adjacent to the trigger in the direction of the guide rail by means of hydraulic or pneumatic elements.

The term "running surface" refers to the surface of the area supported by springs, which surface faces the guide rail and the contact element runs along.

The term "running along" can designate both rolling along, if the contact element is designed as a roller, and sliding along, if the contact element is designed as a brake lining.

Ideally, the trigger is a rocker arm that is set in rotation to get from the triggered to the untriggered state and vice versa. The trigger also has a support which prevents all translational movements of the contact element in the triggered state, except upwards, parallel to the guide rail.

When the trigger is not activated, it must prevent contact between the contact element and the guide rail. For this purpose, it makes sense to equip the trigger with a support on which the contact element rests in the untriggered state. The support is ideally a bowl-like or groove-like section of a component that prevents the roller from wobbling back and forth and possibly contacting the guide rail.

The trigger designed as a rocker arm is pivoted around a bolt that serves as a pivot point. If a force is now exerted on the rocker arm, which force does not act on the pivot point, the rocker arm is set in rotation around the pivot point. A rotational movement of the rocker arm in the direction of the guide rail then causes at least part of the trigger to move in the direction of the guide rail. If the support with the contact element is in the area of the part of the trigger rotating in the direction of the guide rail, the contact element can be brought into contact with the guide rail. This offers the advantage that no complex linear guide is required to move the trigger from its untriggered to its triggered position.

In another preferred embodiment, an electromagnet moves the trigger to its untriggered position and holds it there. At the same time, a spring acts on the trigger in such a way that the latter pivots into its triggered position as soon as the electromagnet is no longer energized.

If the trigger is actively held in its untriggered position by an electromagnet, while another force tries to move it to its triggered position, a power failure and the failure of the electromagnet caused by this power failure during a car movement will automatically lead to the activation of the triggering unit and then to the activation of the elevator braking device. It is also possible to actively hold the electromagnet in its untriggered position by a pneumatic or hydraulic unit or a device that no longer exerts force on the trigger in the event of a power failure.

If the element that moves the trigger into its triggered position is executed as a compression or tension spring, this offers the advantage that a force is permanently exerted on the trigger so that a malfunction caused by leakage or a fault in the electronics or control is excluded.

If the electromagnet and the spring element both act at the same point or at the same height, it must be ensured that the spring force is less than the magnetic force, otherwise the trigger is permanently held in its triggered position. If the trigger is designed as a rocker arm that rotates around a specific pivot point in order to reach the triggered or untriggered state, it makes sense to let the electromagnet act at a greater distance from the pivot point than the spring, so that a higher torque will be generated with the same force.

The armature of the electromagnet is preferably connected to a plunger which presses the trigger into its untriggered position and holds it there when the armature is attracted to the coil of the electromagnet.

In order to obtain freedom in designing the installation space without creating an excessively large air gap between the electromagnet and the trigger, it makes sense to equip the electromagnet with a plunger that presses the trigger when the electromagnet is energized. For this purpose, the plunger is ideally attached to the armature of the electromagnet by being welded, screwed, pressed to it or secured with a locking ring against axial slipping in a bore. The position of the plunger is chosen so that, when the armature of the electromagnet is attracted to the coil, the plunger presses against the trigger. In order not to exert unfavourable moments on the armature via the plunger, it makes sense to guide the plunger through the electromagnet coaxially to the longitudinal axis of the armature.

The plunger is ideally a shaft made of an inelastic, lightweight material such as aluminum.

In a further preferred embodiment, the contact element is a roller which, in its activated state, rolls along a guide rail with one side of its lateral surface and, with the other side of its lateral surface, it rolls along the triggering base body.

If the contact element is designed as a roller, it rolls along the guide rail in its activated state, if the friction between the guide rail and the contact element is high enough. As a result, when the elevator car moves downwards, the contact element moves upwards relative to the elevator car, without excessive wear. In contrast to a contact element designed as a brake lining, a contact element designed as a roller can therefore be used longer.

The term "activated state" refers to the state, when the contact element is in contact with the guide rail. It is therefore the state at the time the trigger is activated.

In a further preferred embodiment, the contact element is a flat brake lining. In the activated state the flat brake lining rests against the guide rail. At the same time, it rests against the triggering base body via a linear bearing, preferably in the form of a linear rolling bearing. Due to the sliding friction force between it and the guide rail the flat brake lining is carried along.

For this purpose, the trigger must be moved perpendicularly to the guide rail in order to get from the triggered to the untriggered state. In the triggered state, i.e. when the trigger has been moved in the direction of the guide rail so that the brake lining is in contact with the guide rail, friction occurs between the brake lining and the guide rail. In order to avoid unnecessary wear on the brake lining before it is in the gap between the running surface pressed by springs in the direction of the guide rail and the guide rail, the trigger is equipped with a linear bearing on which the brake lining rests with one side. Due to the sliding friction between the guide rail and the brake lining, the brake lining is moved upwards relative to the trigger until it reaches the gap between the running surface pressed by springs in the direction of the guide rail and the guide rail. There, the friction between the guide rail and the brake lining is significantly increased by the normal force applied by the springs to the brake lining. The brake lining carries along the coupling link connected to it and brings the brake wedge of the elevator braking device attached to the lower end of the coupling link into the braking position.

Ideally, the contact element is coated with plastic, preferably with polyurethane with a Shore A hardness of 65-80°.

In order to ensure an ideal friction coefficient between the guide rail and the contact element while at the same time minimizing wear and tear, it makes sense to equip the contact element with a plastic such as polyurethane.

If the contact element is a roller, it is advantageous to equip only the area of the lateral surface of the roller with this material, while the rest of the roller is made of metal in order to maintain high roller strength.

Preferably, the coupling link can be pivoted on the elevator braking device and preferably articulated on its brake wedge.

For this purpose, it makes sense to generate the connection between the coupling link and the contact element, as well as the connection between the coupling link and the brake wedge via bolts that are mounted in a rotatable manner relative to the coupling link. This prevents the coupling link from tilting or bending.

It should also be said that independent protection is also sought for an entire elevator or vertical elevator with at least one triggering unit according to the invention.

In addition, independent protection is also claimed for the use of the triggering units according to the invention for activating elevator braking devices of different types. In this case, the elevator braking devices preferably remain unchanged or remain unchanged to the extent that they do not require any new approval or certification. Said elevator braking devices that are activated with it are typically of completely different types and not just differently dimensioned variants of one and the same construction.

DETAILED DESCRIPTION OF THE PREFERRED EMBODIMENTS

The functioning of the device according to the invention is described by way of example with reference to FIGS. 1 to 11.

Figure 1:
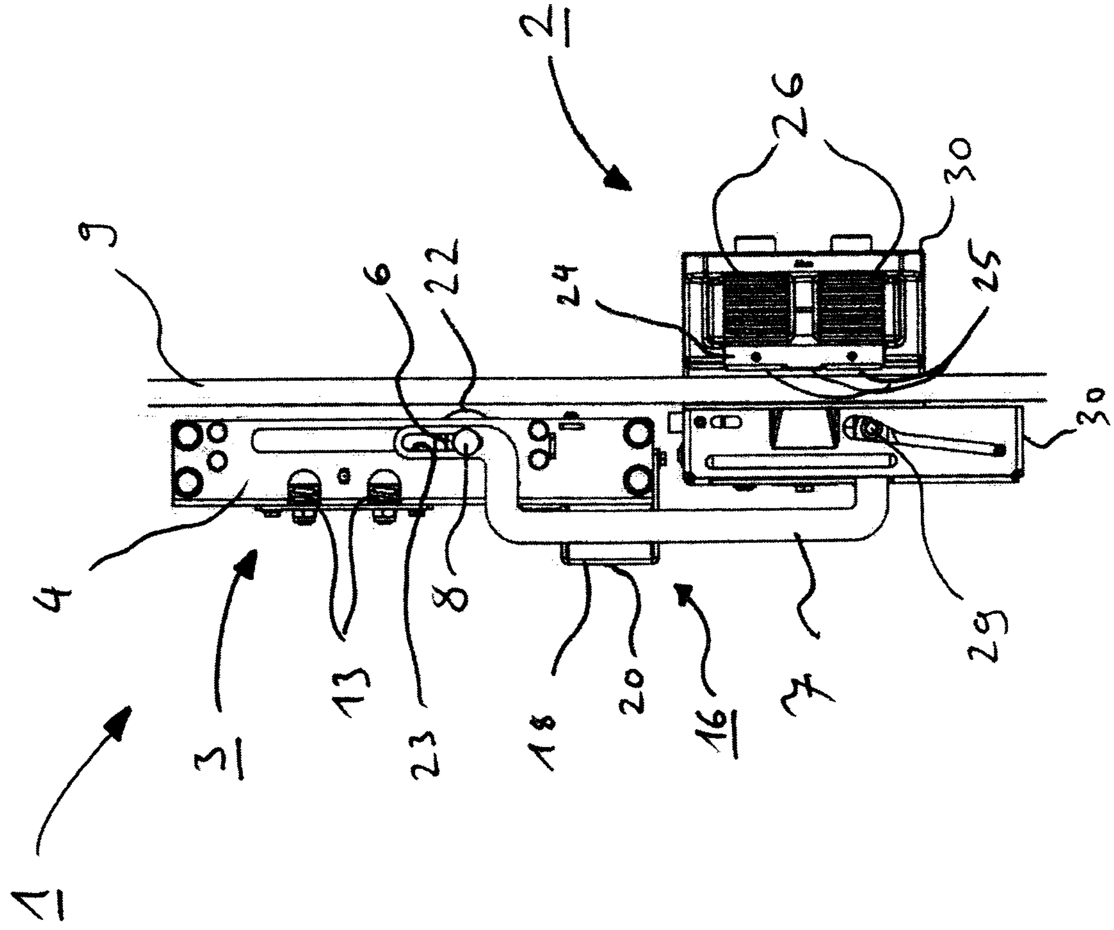
FIG. 1 Triggering unit in the untriggered position together with an elevator braking device.

In FIG. 1 a triggering unit 1 of the type claimed is shown together with an elevator braking device 2. The triggering unit 1 and the elevator braking device 2 are both attached to the car of an elevator, which is not shown here. In the present case, the triggering unit 1 is arranged above the elevator braking device 2. As can be seen, the triggering unit 1 and the elevator braking device 2 are completely separated from one another. Their housings are preferably spaced from one another. In any case, they are functionally completely separated from each other.

The only connection of a physical and usually also functional nature is the coupling link 7, which is designed in the manner of a rod and which is here preferably articulated at its one end to the triggering unit 1 and preferably articulated at its other end to the elevator braking device or the brake wedge of said device. In most cases the coupling link bridges the distance between the housings.

In the embodiment presented here the elevator braking device 2 is used to decelerate an impermissibly fast or uncontrolled downward travel of an elevator or of the car belonging to the elevator.

Before explaining the functioning of the triggering unit 1 and the interaction of the triggering unit 1 with the elevator braking device 2, for the sake of completeness in terms of patent law, the functioning of an elevator braking device 2 as it is used together with the triggering unit 1 will be briefly discussed below.

Figure 11:
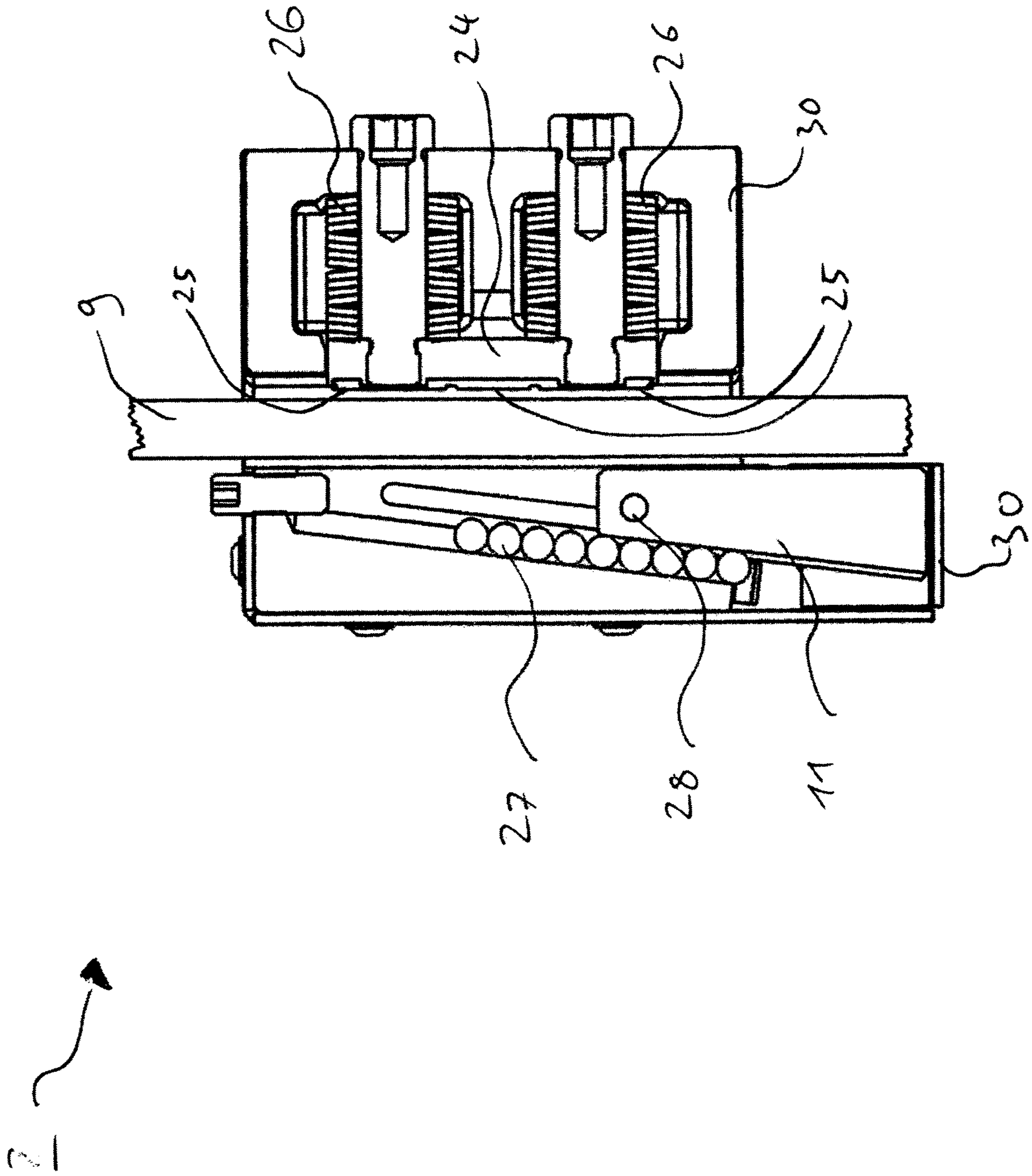
FIG. 11 Sectional view of the elevator braking device in the inactive position.

For this purpose, the elevator braking device 2 is shown in FIG. 11 in a sectional view. Unlike the triggering unit 1, the elevator braking device 2 is in many cases attached to the elevator car in a transversely displaceable or a floating manner and encompasses the guide rail 9 with its base body 30 in the assembled state. In doing so, it is not in contact with the guide rail 9 in the inactive position shown in FIG. 11. On one side of the rail 9, the base body 30 holds a brake wedge 11 in a ready-to-brake position, while on the opposite side of the rail 9 a brake lining 25 mounted on a carrier plate 24 is held in a ready-to-brake position. In order to bring the elevator braking device 2 into its braking position, the brake wedge 11 must be moved upwards, for example along the linear ball bearing 27, into the narrowing gap between the guide rail 9 and the base body 30.

Due to the transversely displaceable or floating attachment of the elevator braking device 2 to the elevator car, the brake lining 25 also comes into contact with the guide rail 9 so that the guide rail 9 is clasped by the brake wedge 11 and the brake lining 25. In order to avoid excessive delay, which under certain circumstances leads to injury to people in the elevator, disk springs 26 are often provided as braking force limiters on the elevator braking device 2, as shown here.

The simultaneous downward movement of the elevator car and thus also of the elevator braking device 2 leads to the brake wedge 11 being automatically further driven into the gap between the guide rail 9 and the base body 30. The braking process is therefore self-locking.

In order to be able to activate the braking process, a bore 28 is provided, for example, on the braking element or the brake wedge 11. For connecting it to the coupling link 7 of the triggering unit 1 a bolt 29 is pushed into the bore. Thus an upward movement of the coupling link 7 leads to the automatic response of the elevator braking device 2, when the triggering unit 1 and the elevator braking device 2 are installed.

The triggering unit 1 applies lower frictional forces (regularly by more than a factor of 5, mostly by more than a factor of 10) than the elevator braking device 2. Due to that fact, the function of the triggering unit 1 is essentially limited to causing the elevator braking device to respond, for example by moving its brake wedge into the position from which it retracts automatically.

Figure 3:
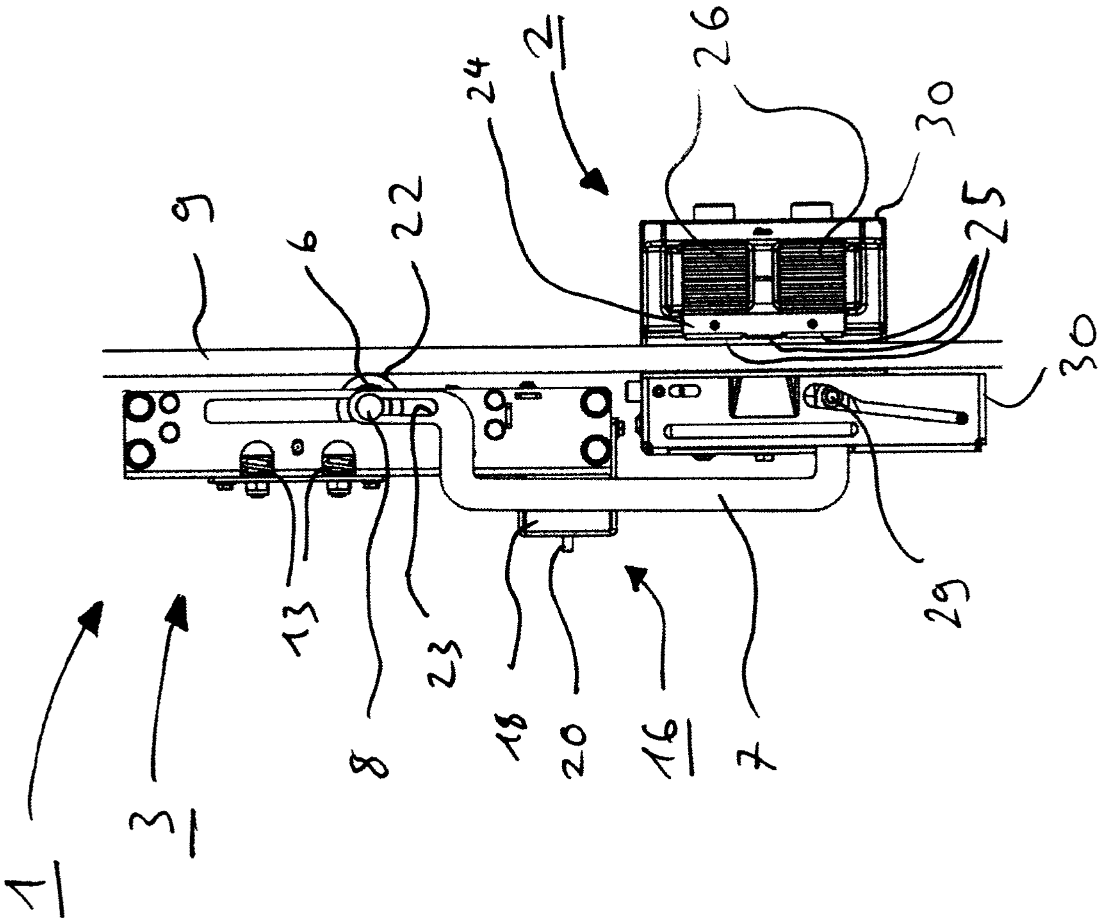
FIG. 3 Triggering unit in the state immediately before activation of the elevator braking device, together with an elevator braking device.
Figure 12:
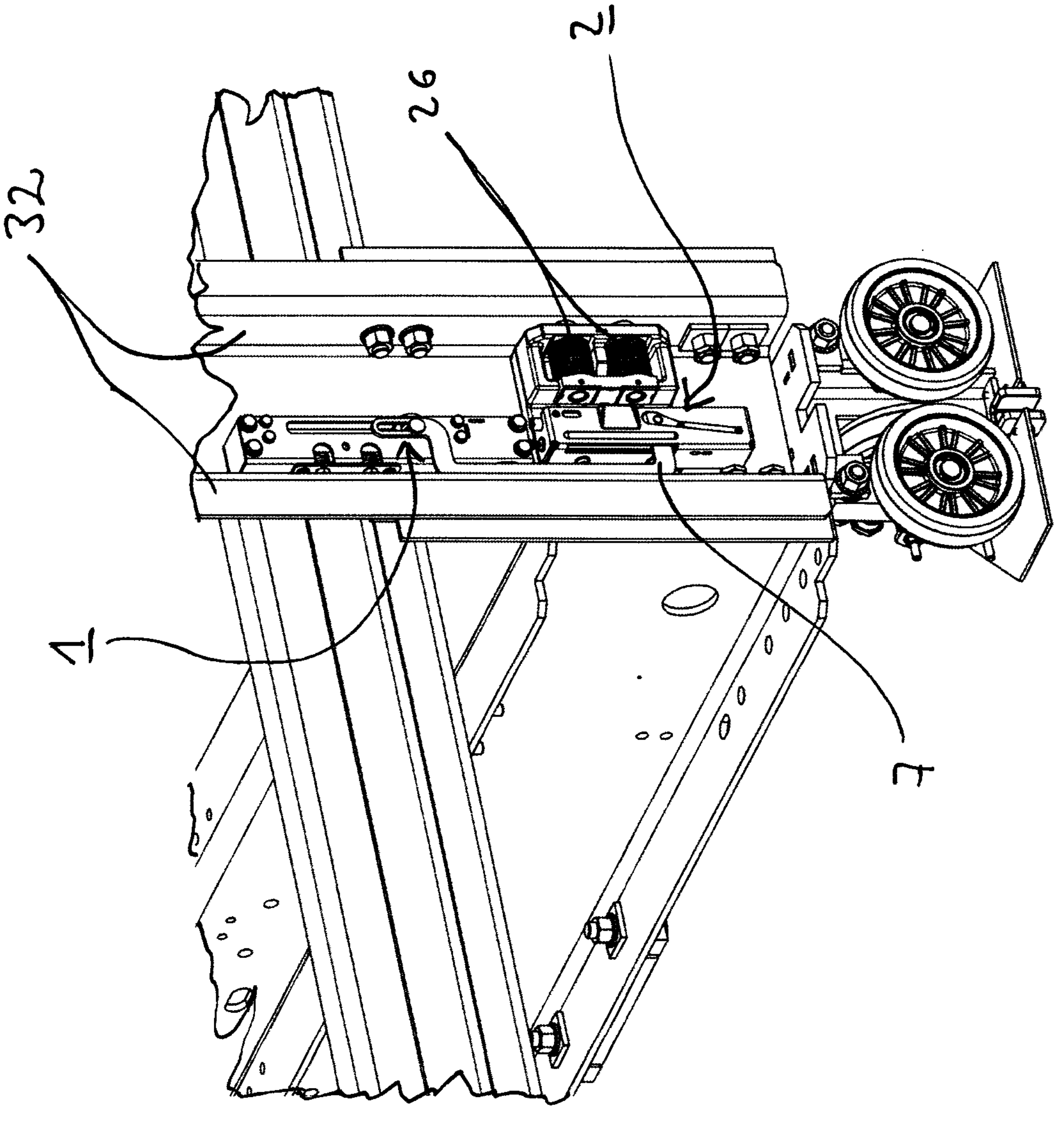
FIG. 12 Illustration of the preferred way of installing the construction according to the invention in the vertical beam of an elevator car frame.

It can be clearly recognized in FIG. 3 that the coupling link 7 which is mostly designed in the manner of a rod, preferably has a C-shape with a connecting extension adjoining it on one side for fastening the contact element 6. In this way, the coupling link can engage from behind into the interior of the elevator braking device 2 and move its brake wedge 11, see in this respect FIG. 12 illustrating this situation in a comprehensible manner.

In the state of the triggering unit 1 shown in FIG. 1, the contact element 6 of the triggering unit 1 is not in contact with the guide rail 9 of the elevator. Thus, an activation of the elevator braking device 2 connected via the coupling link 7 to the triggering unit 1 is prevented and the elevator can be moved up and down in normal operation.

Figure 2:
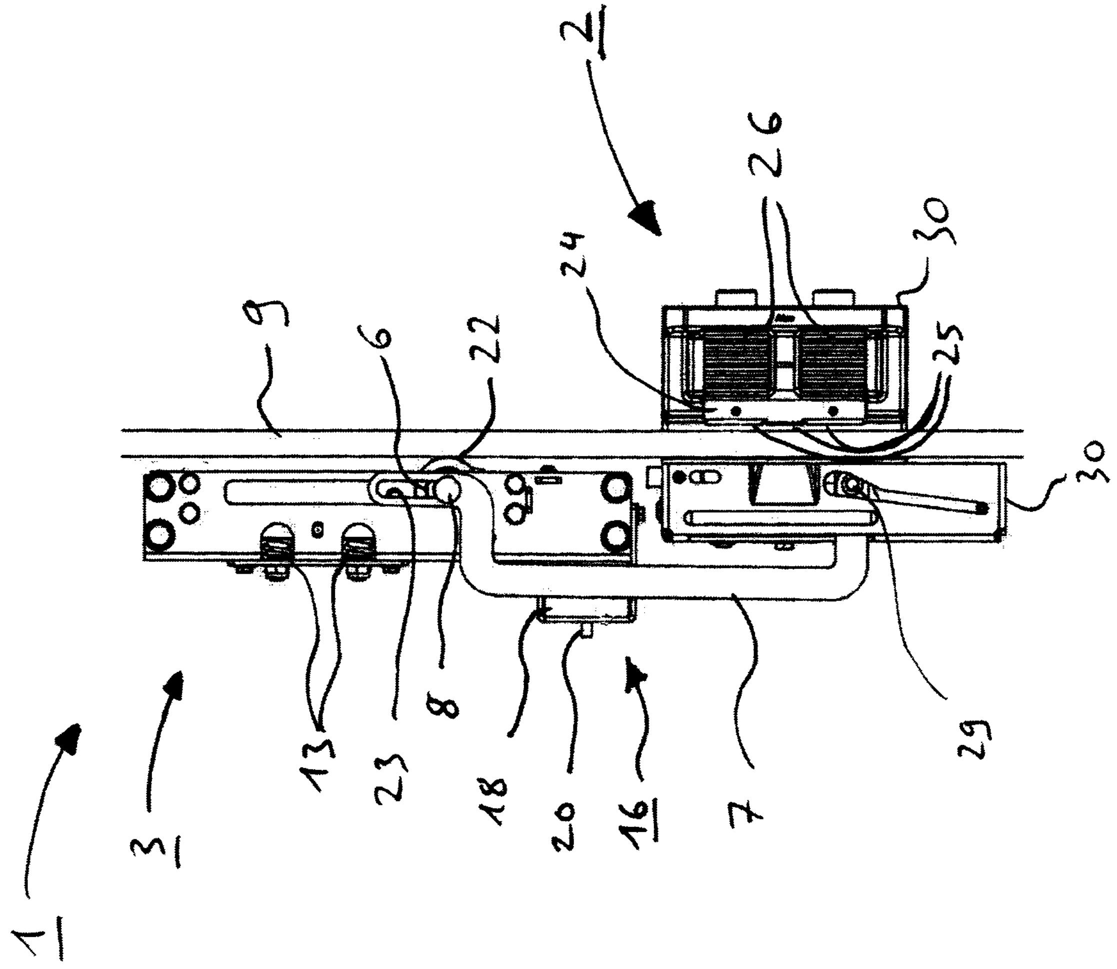
FIG. 2 Triggering unit in which the contact element was brought into contact with the guide rail, together with an elevator braking device.

If an impermissibly high downward speed of the elevator car is detected, the triggering unit 1 is brought into the position shown in FIG. 2. For this purpose, the contact element 6 which is embodied here as a roller 6, is moved in the direction of the guide rail 9 so that the lateral surface 22 of the contact element 6 is in contact with the guide rail 9. The contact element 6 which initially still has the same downward speed as the elevator car and the rest of the triggering unit 1 located on the elevator car then rolls along the guide rail 9. When viewed relative to the elevator car and the rest of the triggering unit 1, the contact element 6 thus moves upwards. In doing so, the contact element 6 is guided by means of a bolt 8 along the elongated hole 23 in the coupling link 7. At the end facing away from the contact element 6, the bolt 8 has a diameter that is larger than the diameter of the elongated hole 23. Since the bolt in the contact element 6 is secured against axial slipping, it is thus ensured in the assembled state that the contact element 6 does not move away from the elongated hole 23 to an impermissible extent in the axial direction.

Due to the upward movement of the contact element 6 relative to the rest of the triggering unit 1, the contact element 6 or the bolt 8 soon thereafter rests against the upper end of the elongated hole 23 of the coupling link 7.

This situation is shown in FIG. 3. As soon as the bolt 8 of the contact element 6 rests against the upper end of the elongated hole 23, a further upward movement of the contact element 6 relative to the elevator car also results in an upward movement of the coupling link 7 relative to the elevator car and the elevator braking device associated to it.

As a result, the brake wedge 11 of the elevator braking device 2 is pulled upwards into the gap between the guide rail 9 and the base body 30 of the elevator braking device 2, leading to an automatic response of the elevator braking device 2 due to the further downward movement of the elevator car.

Figure 4:
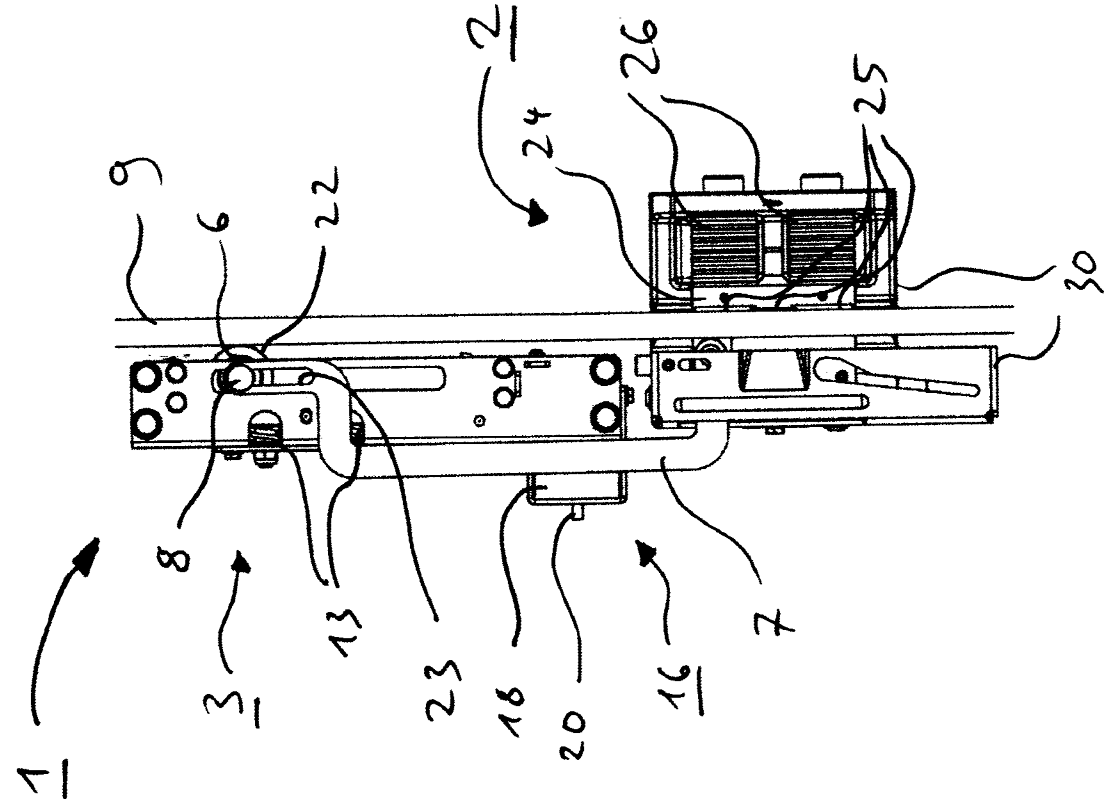
FIG. 4 Triggering unit together with the elevator braking device in the braking position.

FIG. 4 shows the position of the triggering unit 1 and the elevator braking device 2 during the braking process.

The processes inside the triggering unit 1 are explained by means of FIGS. 5 to 9. In each case the triggering unit 1 is shown in sectional view.

Figure 5:
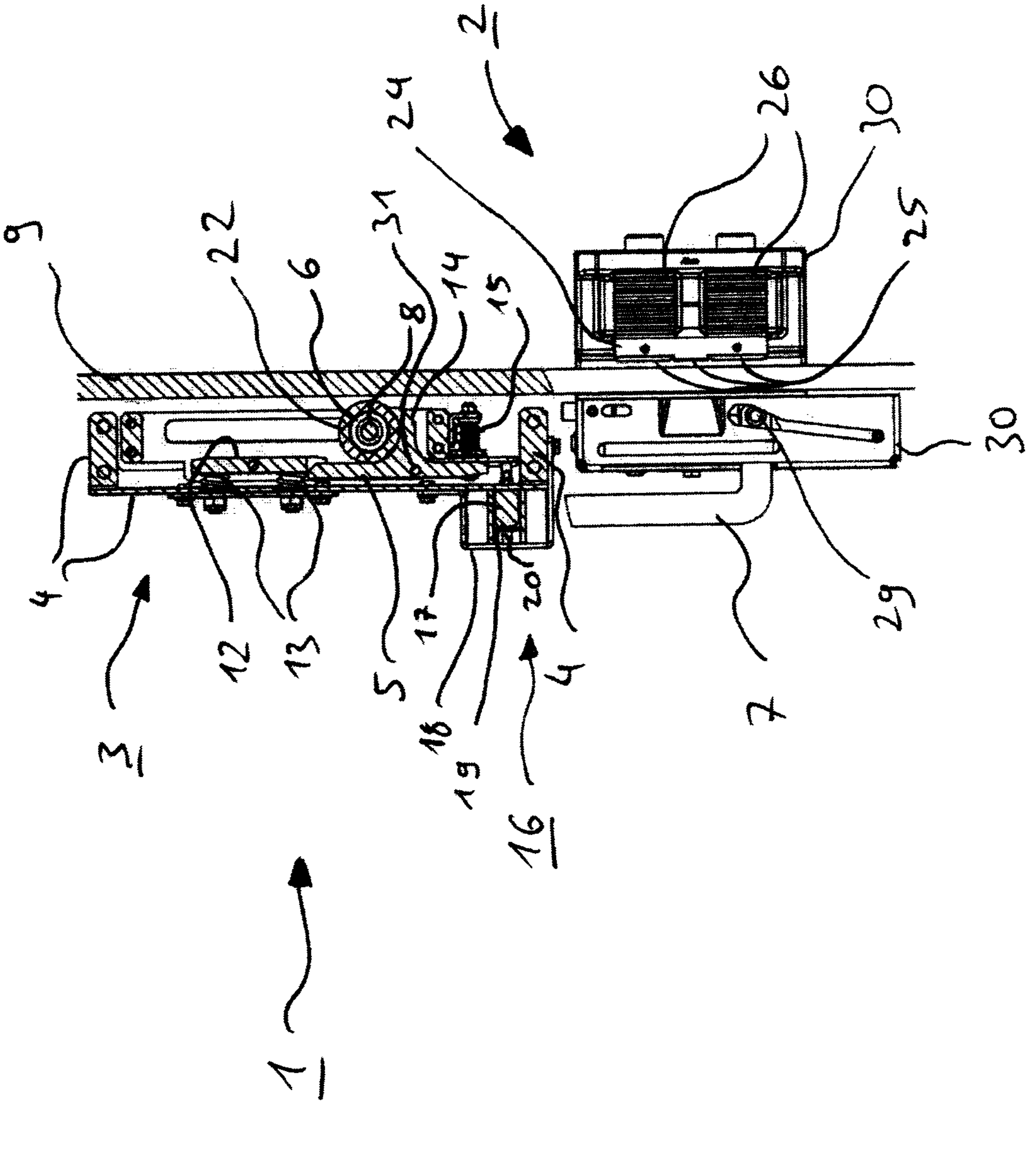
FIG. 5 Sectional view of the triggering unit in the position shown in FIG. 1, together with an elevator braking device.

In FIG. 5 the triggering unit 1 is in the same position as in FIG. 1.

The contact element 6 lies on the support 14 of the trigger 5 which is in the untriggered state. The latter preferably has the shape of a rocker arm, usually in the shape of a T. The pivot point 23 is essentially where the two arms of the T meet its shaft. The shaft of the T forms the support 14.

Since the trigger 5 is at a corresponding distance from the guide rail 9 in the inactive state, the contact element 6 does not come into contact with the guide rail.

The trigger 5 is held in this position by an electromagnet 16. For this purpose, the electromagnet 16 is connected to a plunger 20 that presses against an arm, i.e. the lower end of the trigger 5, as long as the electromagnet 16 is energized. At the same time, the compression spring 15 also acts on the lower end of the trigger 5 against the force of the plunger 20. The torque of the spring 15 around the pivot point 31 of the trigger 5 is lower than the torque of the plunger 20 around the pivot point 31. In the present embodiment, this is achieved by the spring acting closer to the pivot point 31 than the plunger 20 and the force of the spring 15 being smaller than or at most equal to the force exerted by the electromagnet 16 on the plunger 20. However, it is also conceivable to let the spring 15 and the plunger 20 act at the same distance from the pivot point 31 on the trigger 5. In this case, the spring pressure must be smaller than the force of the magnet or the plunger.

Figure 6:
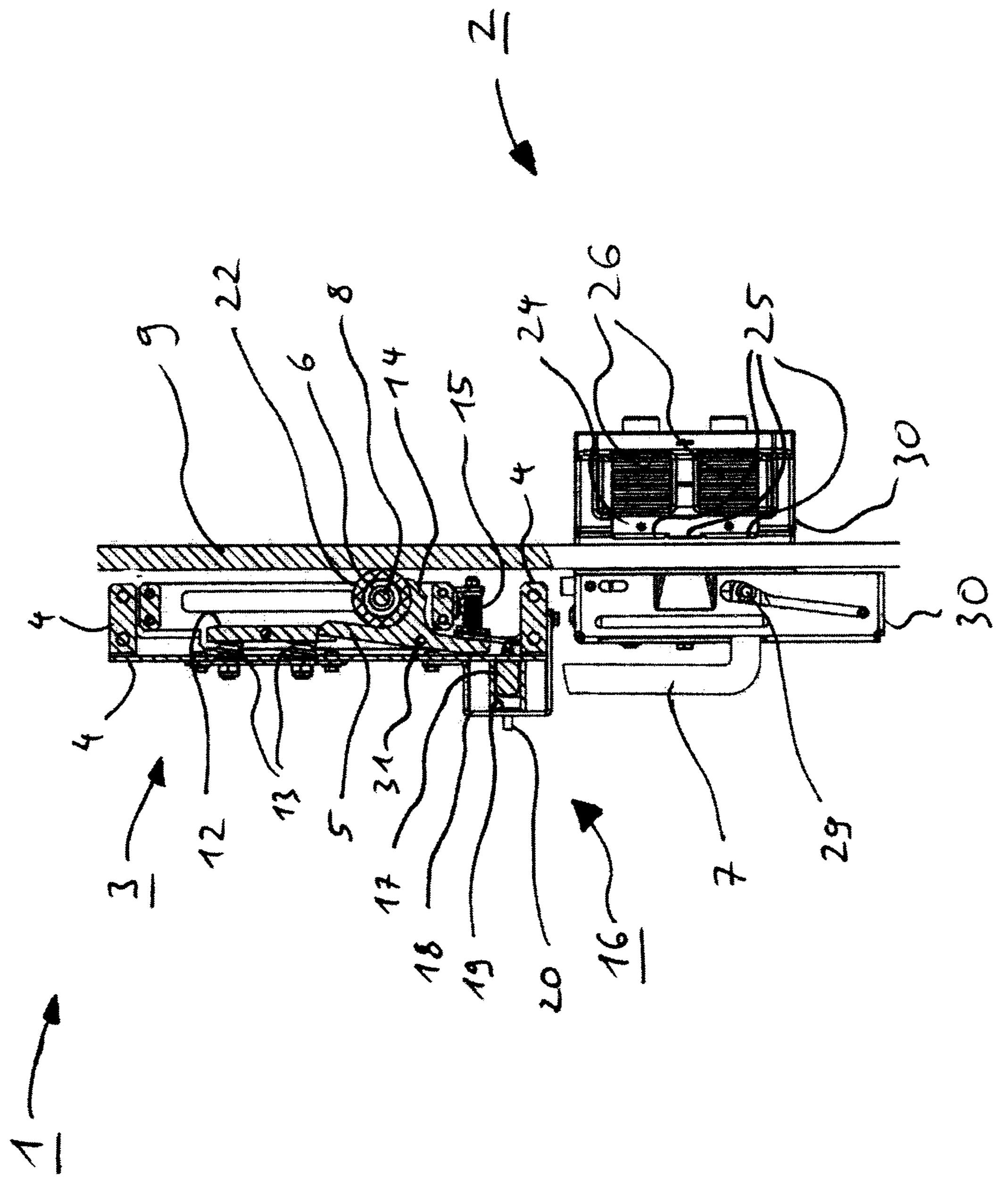
FIG. 6 Sectional view of the triggering unit in the position shown in FIG. 2, together with an elevator braking device.

As soon as an impermissibly high speed of the elevator car is detected, the electromagnet 16 is no longer energized. Since the plunger 20 is then no longer caused by the electromagnet 16 to hold the trigger 5 in its untriggered position, the trigger 5 is rotated clockwise around the pivot point 31 by the spring pressure of the compression spring 15 until the contact element 6 rests against the guide rail 9. The trigger 5 is then in the triggered position. This situation is shown in FIG. 6 and in FIG. 2.

Figure 7:
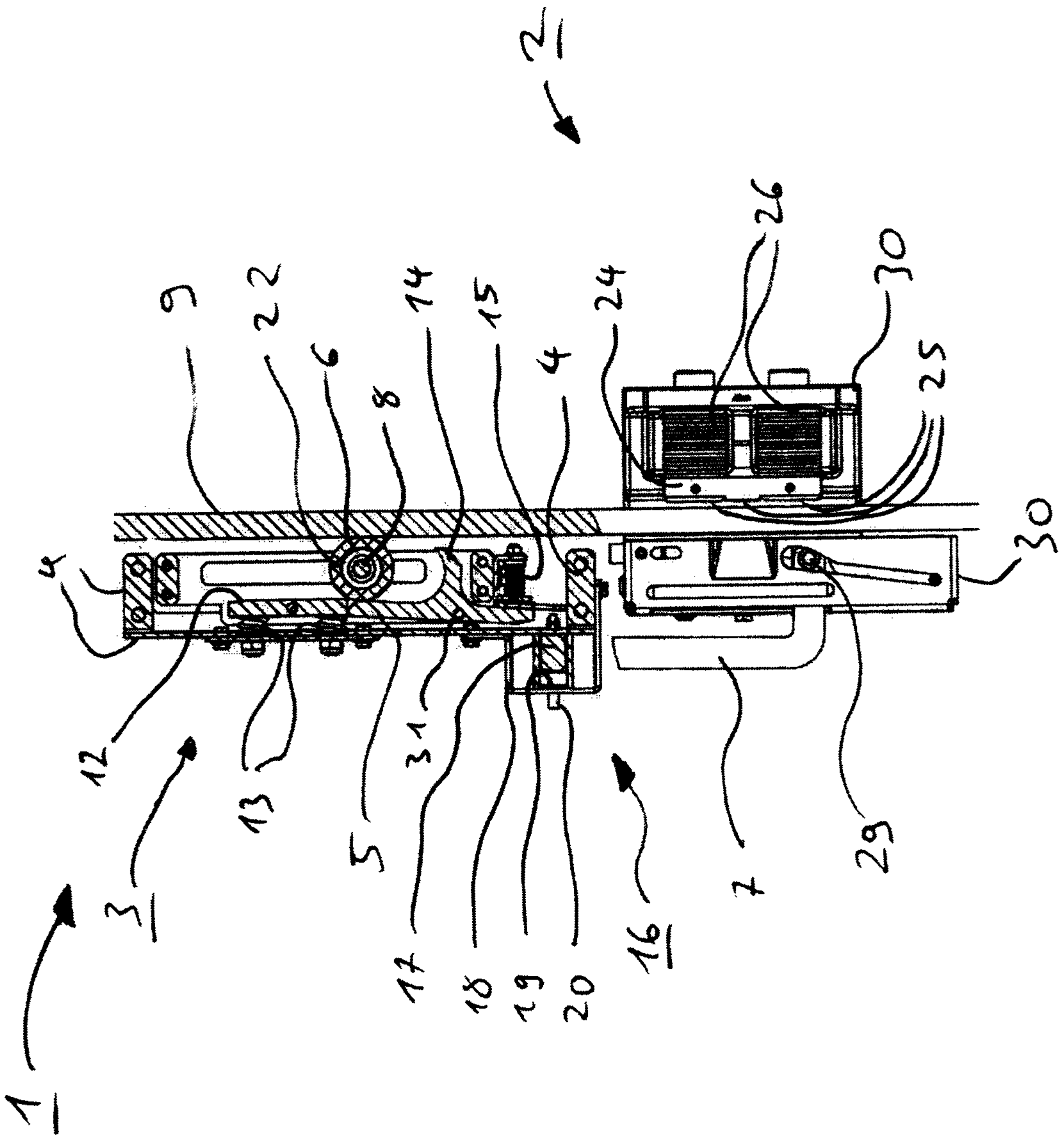
FIG. 7 Sectional view of the triggering unit in the position shown in FIG. 3, together with an elevator braking device.
Figure 8:
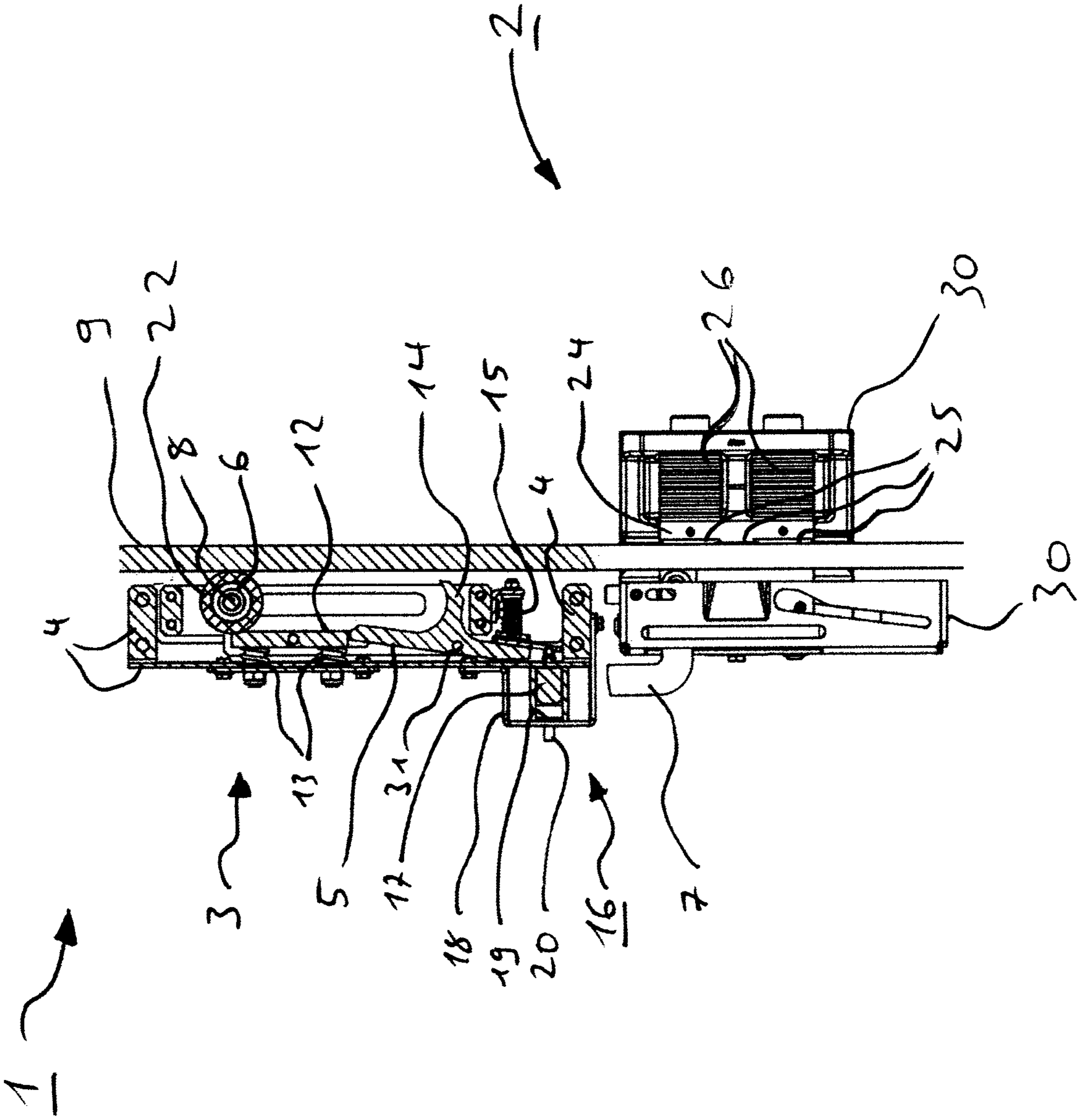
FIG. 8 Sectional view of the triggering unit during activation of the elevator braking device, together with an elevator braking device.

FIG. 7 illustrates the same position of the triggering unit 1 as FIG. 3.

What is also remarkable about FIG. 7 is that it shows how the contact element 6 has pivoted the trigger 5 back in the direction of its untriggered position against the force of the spring 15 acting on it. This pivoting preferably takes place in that the contact element runs along the other arm of the T-shaped trigger facing away from the plunger 20 and, because of its opposite support on the guide rail, pushes this arm away from itself or its center. This will usually lead to a reduction in the air gap on the retaining magnet, which can be used to optionally work with a small magnet. But this pivoting also has another effect. The movement of the trigger in the direction of its untriggered position recompresses the compression spring. This tensions the trigger. In this way it can be ensured that, immediately after triggering, the contact element is applied with enough normal force to find the frictional force required for its further intended displacement-despite the fact that the leverage deteriorates during its removal from the inactive standby position.

Due to the pivoting of the trigger just mentioned, the contact element 6 or the roller preferably forming it has already moved upwards by the amount of the length of the elongated hole 23 of the coupling link 7 relative to the elevator car moving downwards. The bolt 8 which connects the contact element 6 to the coupling link 7 rests against the upper end of the elongated hole 23. The contact element 6 is located at the upper end of the trigger 5, just in front of the running surface 12 of the triggering base body 3 which is equipped with the preloaded compression springs 13. The running surface 12 is usually arranged in such a way that it can usually be brought into alignment with the arm of the T-shaped trigger 5 facing it, so that an at least substantially aligned path is generated the contact element 6 can move along.

With a further downward movement of the elevator car or a further upward movement of the contact element 6 relative to the rest of the triggering unit 1, the contact element 6 moves into the gap between the running surface 12 of the triggering base body 3 and the guide rail 9. The running surface 12 is pressed in the direction of the guide rail 9 by the preloaded compression springs 13 which are supported by the housing 4 of the triggering base body 3. Hence, the contact element 6 is also pressed in the direction of the guide rail 9 when passing the gap, leading to a significantly increased friction between the lateral surface of the roller 22 and the guide rail 9.

The lateral surface of the roller 22 is ideally made of polyurethane and/or a material with a Shore A hardness of 65-80°. This ensures high friction.

In a version that is less preferred for reasons of the higher noise level, a roller with a lateral steel surface is also conceivable as an alternative. This variant is preferably designed with a knurl to ensure friction even on oiled rail surfaces.

The increase in friction between the contact element 6 and the guide rail 9 ensures that the contact element 6 continues to roll along and moves upwards relative to the rest of the triggering unit 1 without slipping and being pulled down by the rest of the triggering unit 1. Since the contact element 6 also takes the coupling link 7 upwards via the bolt 8 and relative to the elevator car, the brake wedge 11 of the elevator braking device 2 is also moved upwards, causing the elevator braking device 2 to respond automatically.

Figure 9:
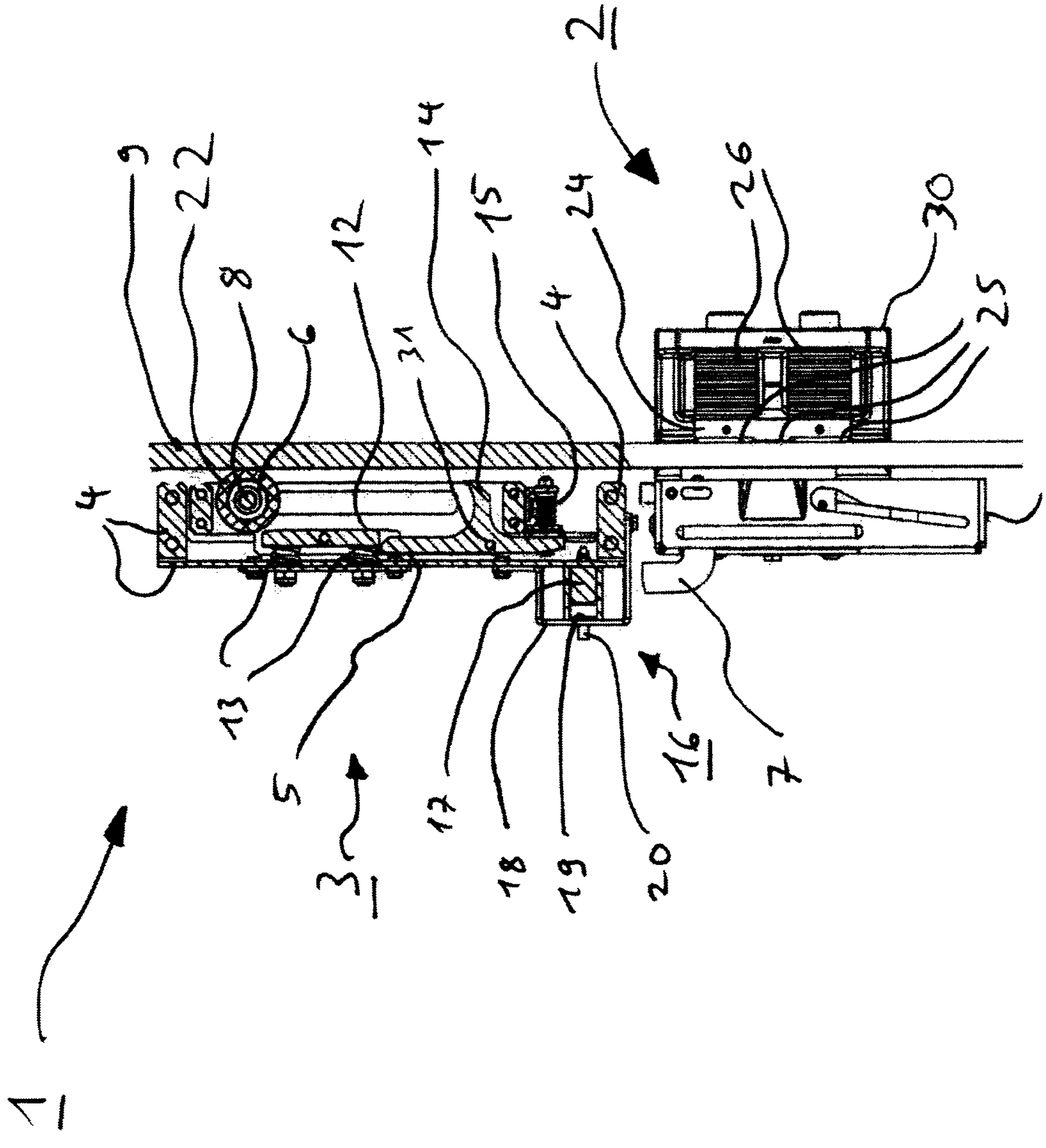
FIG. 9 Sectional view of the triggering unit in the position shown in FIG. 4, together with an elevator braking device.

During the braking process, the contact element 6 is located above the running surface 12 and can move freely without being loaded. Gravity is neglected here. This situation is illustrated in FIG. 9 and FIG. 4.

After the elevator braking device 2 has braked the car completely, the brake wedge 11 can be brought back from the braking position to its starting position by moving the elevator car upwards a little. Thus, the brake wedge 11 is released downwards from the wedge-shaped gap between the base body assigned to it and the guide rail. As a result, the contact element 6 moves downwards relative to the rest of the triggering unit 1 and, in doing so, it carries along the coupling link 7 as soon as the bolt 8 rests against the lower end of the elongated hole 23 of the coupling link 7. Accordingly, the brake wedge 11 is also moved downwards relative to the rest of the elevator braking device 2.

After the contact element 6 has passed the gap between the running surface 12 and the guide rail 9, it falls back into its starting position due to gravity and remains on the support 14 of the trigger 5. However, this only applies, if the retaining magnet previously had been energized again and had therefore brought the trigger 5 back into its untriggered position or at least held it there. Otherwise, the contact element 6 now, on its way back, meets the preferably correspondingly beveled corner of the trigger 5. It then pushes it back in the direction of its untriggered position, so that the air gap on the retaining magnet becomes sufficiently small to enable the retaining magnet, which is energized again, to hold the trigger in its untriggered position against the spring force.

Figure 10:
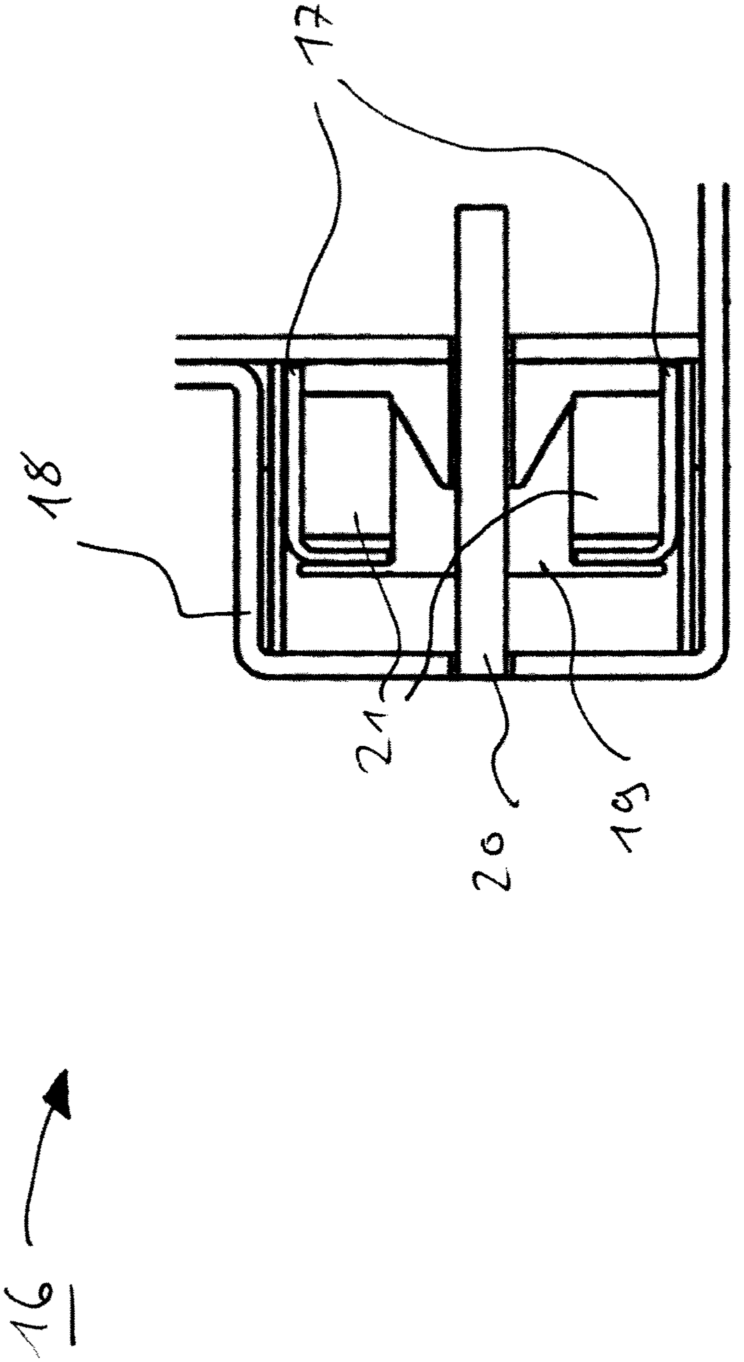
FIG. 10 Sectional view of the electromagnet provided for activation of the trigger.

In FIG. 10, the electromagnet 16 is shown in a sectional view. The plunger 20 is connected to the armature 19 of the electromagnet, mostly by force-fitting. It protrudes in the axial direction through the coil 21 and the housing 17 surrounding the coil 21 and the housing 18 surrounding the electromagnet 16 in order to be able to act on the trigger 5. On the left-hand side, the housing 18 has a through hole through which the plunger 20 protrudes when the electromagnet 16 is not energized.

The construction according to the invention is usually operated in a power-saving manner. If the elevator car remains in the standby position for a long time, the current supply to the retaining magnets is stopped so that the contact elements come to rest against the guide rail.

Compared with the conventional mechanical activation of the elevator braking devices, the activation using the triggering units 1 according to the invention has the advantage that no synchronization is required. Rather, it is structurally ensured that simultaneous electrical actuation of the triggering units results in synchronous response even without special synchronization. The omission of the synchronization means that a considerable amount of installation space can be saved, mostly in the area below the elevator car. This noticeably meets the need for smaller shaft pits or shaft heads.

The invention claimed is:

1. A triggering unit for actuating an elevator braking device, comprising:

a triggering base body which can be mounted on an elevator car, a trigger, a contact element and a coupling link via which the contact element can be connected to an elevator braking device, wherein the trigger keeps the contact element at a distance from a guide rail in an untriggered state and brings the contact element into frictional contact with the guide rail in a triggered state, so that, in an event of a relative movement between the elevator car and the guide rail, the contact element moves along a gap between the triggering base body and the guide rail, carries along the coupling link and causes the elevator braking device to respond automatically due to the movement of the coupling link, wherein the triggering unit can be mounted separately on the elevator car or at a distance from the elevator braking device and is connected to the elevator braking device exclusively via the coupling link, wherein the coupling link has an elongated hole via which the coupling link is connected to the contact element by a bolt so that the coupling link is only carried along by the contact element when the bolt connecting the contact element and the coupling link has reached an upper end of the elongated hole, wherein when the trigger is not activated, the bolt is located in the lower area of the elongated hole, and wherein the trigger is a rocker arm which is set in rotation to get from the triggered state to the untriggered state and vice versa, and which has a support for the contact element which prevents all translational movements of the contact element in the triggered state, except upwards, parallel to the guide rail.

2. The triggering unit according to claim 1, wherein the contact element is connected to the coupling link in such a way that the contact element can move by a certain amount without carrying along the coupling link.

3. The triggering unit according to claim 1, wherein a running surface of the triggering base body the contact element runs along when the contact element is in contact with the guide rail and which is adjacent to the trigger, is pressed in a direction of the guide rail by preloaded springs and exerts a force in the direction of the guide rail on the contact element when the running surface is in a corresponding section of the gap between the triggering base body and the guide rail.

4. The triggering unit according to claim 1, wherein the contact element is a flat brake lining which rests against the guide rail in the activated state and, at the same time, rests against the triggering base body via a linear bearing, and is carried along due to a sliding friction force between the flat brake lining and the guide rail.

5. The triggering unit according to claim 1, wherein the contact element is made of plastic or is coated with such a plastic.

6. The triggering unit according to claim 1, wherein the coupling link can be pivoted on the elevator braking device and articulated on a brake wedge of said elevator braking device.

7. A method of using a triggering unit according to claim 1, comprising using the triggering unit for activating elevator braking devices of different types.

8. An elevator with an elevator car that can be moved along guide rails and an overspeed governor which, in an event of overspeed or an abnormal travel condition, activates an elevator braking device by means of an electrical signal which acts directly on the elevator braking device and causes the elevator braking device to respond, wherein the elevator has at least one triggering unit according to claim 1.

9. The triggering unit according to claim 1, wherein the contact element is made of or is coated with polyurethane with a Shore A hardness of 65-80°.

10. A triggering unit for actuating an elevator braking device, comprising:

a triggering base body which can be mounted on an elevator car, a trigger, a contact element and a coupling link via which the contact element can be connected to an elevator braking device, wherein the trigger keeps the contact element at a distance from a guide rail in an untriggered state and brings the contact element into frictional contact with the guide rail in a triggered state, so that, in an event of a relative movement between the elevator car and the guide rail, the contact element moves along a gap between the triggering base body and the guide rail, carries along the coupling link and causes the elevator braking device to respond automatically due to the movement of the coupling link, wherein the triggering unit can be mounted separately on the elevator car or at a distance from the elevator braking device and is connected to the elevator braking device exclusively via the coupling link, wherein the coupling link has an elongated hole via which the coupling link is connected to the contact element by a bolt so that the coupling link is only carried along by the contact element when the bolt connecting the contact element and the coupling link has reached an upper end of the elongated hole, wherein when the trigger is not activated, the bolt is located in the lower area of the elongated hole, and wherein an electromagnet moves the trigger into an untriggered position and holds the trigger in the untriggered position, wherein a spring simultaneously acts on the trigger in such a way that the trigger swivels into a triggered position as soon as the electromagnet is no longer energized.

11. The triggering unit according to claim 10, wherein an armature of the electromagnet is connected to a plunger which presses the trigger into the untriggered position and holds the trigger in the untriggered position, when the armature is attracted to a coil of the electromagnet.

12. A triggering unit for actuating an elevator braking device, comprising:

a triggering base body which can be mounted on an elevator car, a trigger, a contact element and a coupling link via which the contact element can be connected to an elevator braking device, wherein the trigger keeps the contact element at a distance from a guide rail in an untriggered state and brings the contact element into frictional contact with the guide rail in a triggered state, so that, in an event of a relative movement between the elevator car and the guide rail, the contact element moves along a gap between the triggering base body and the guide rail, carries along the coupling link and causes the elevator braking device to respond automatically due to the movement of the coupling link, wherein the triggering unit can be mounted separately on the elevator car or at a distance from the elevator braking device and is connected to the elevator braking device exclusively via the coupling link, wherein the coupling link has an elongated hole via which the coupling link is connected to the contact element by a bolt so that the coupling link is only carried along by the contact element when the bolt connecting the contact element and the coupling link has reached an upper end of the elongated hole, wherein when the trigger is not activated, the bolt is located in the lower area of the elongated hole, and wherein the contact element is a roller which, in an activated state, rolls along a guide rail with a first side of its lateral surface and rolls along the triggering base body with a second side of its lateral surface.

* * * * *